United States Patent [19]

Bright

[11] Patent Number: 5,046,589
[45] Date of Patent: Sep. 10, 1991

[54] REDUCTION OF CALIPER LINING WEAR IN AIR BRAKES

[76] Inventor: Larry G. Bright, 4057 Kingsway Dr., Crown Point, Ind. 46307

[21] Appl. No.: 506,943

[22] Filed: Apr. 10, 1990

[51] Int. Cl.⁵ ............................................. F16D 55/22
[52] U.S. Cl. ................................ 188/72.3; 188/73.45; 188/205 A; 188/216
[58] Field of Search ................. 188/72.4, 72.6, 205 A, 188/205 R, 73.44, 73.45, 72.7, 72.8, 72.9, 71.1, 73.31, 72.3, 216, 73.35, 73.36; 192/70.22, 70.28

[56] References Cited

U.S. PATENT DOCUMENTS

| | | | |
|---|---|---|---|
| 1,278,081 | 9/1918 | Roach | 188/72.8 |
| 2,365,369 | 12/1944 | Williams | 188/72.7 X |
| 2,828,833 | 4/1958 | Civello | 188/205 A X |
| 2,850,119 | 9/1958 | Petersen | 188/72.7 |
| 3,065,829 | 11/1962 | Bessler et al. | 188/72.3 |
| 3,392,805 | 7/1968 | Kreitner | 188/72.3 X |
| 3,451,509 | 6/1969 | DeHoff | 188/205 A X |
| 3,455,416 | 7/1969 | Rivett | 188/205 A X |
| 3,734,242 | 5/1973 | Klaue | 188/72.7 X |
| 3,782,510 | 1/1974 | Rath | 188/73.35 X |
| 3,830,343 | 8/1974 | Gardner | 188/72.7 X |
| 3,841,446 | 10/1974 | Gravel, Jr. | 188/73.45 X |
| 4,036,329 | 7/1977 | Anderson | 188/72.9 X |
| 4,310,076 | 1/1982 | Ikeda | 188/206 A X |
| 4,529,067 | 7/1985 | Scott | 188/73.45 X |
| 4,800,993 | 1/1989 | Weber | 188/72.3 X |
| 4,887,696 | 12/1989 | Redenbarger et al. | 188/216 X |

Primary Examiner—Douglas C. Butler

[57] ABSTRACT

In order to reduce friction and wear in an air brake system wherein a caliper moves on upper and lower slide pins and an air chamber is suspended from the caliper by a bracket a portion of the weight of the air chamber is suspended from the upper slide pin by an elastic member placed between the upper slide pin and the bracket at an angle providing a component of force supporting the air chamber and a component of force opposite to the direction of the movement of the caliper when applying a braking force.

10 Claims, 1 Drawing Sheet

U.S. Patent          Sep. 10, 1991          5,046,589
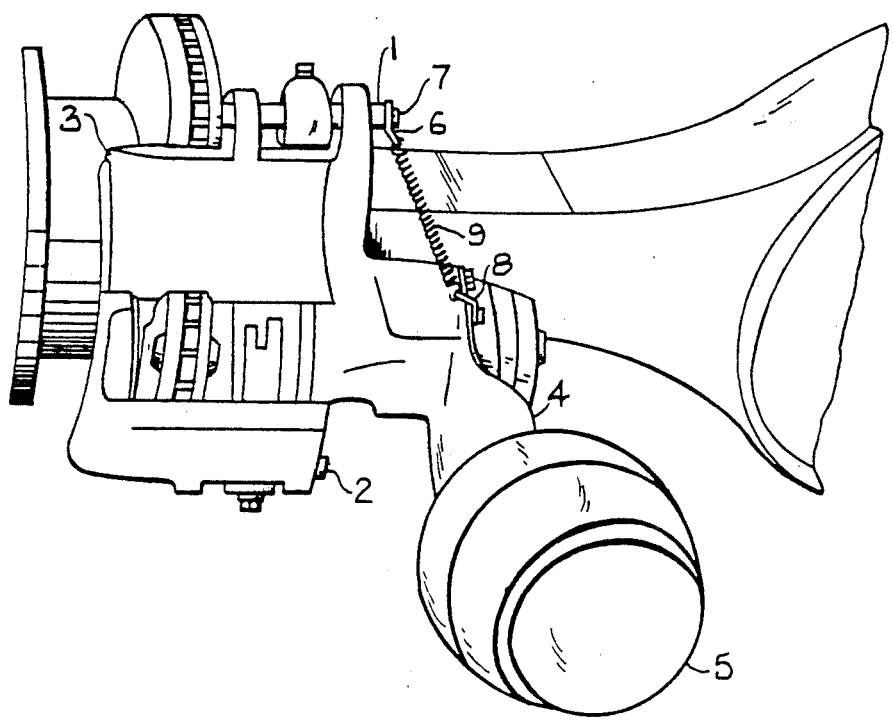
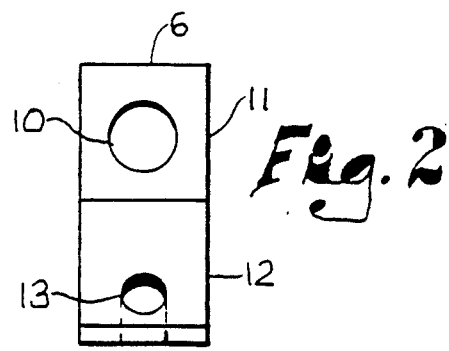
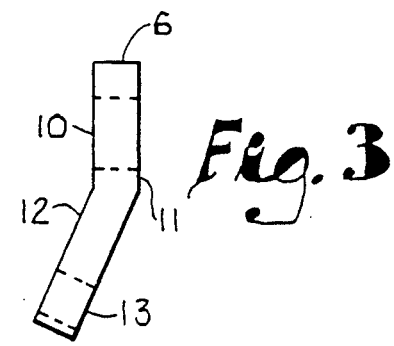
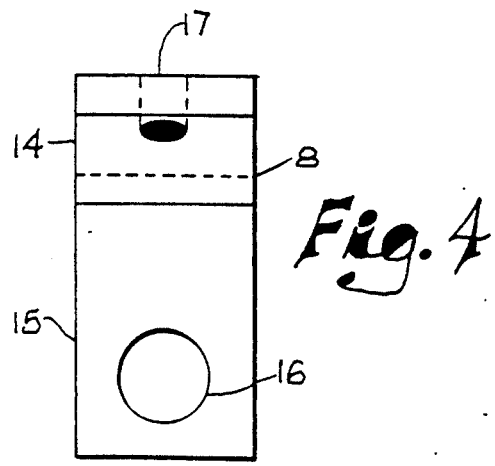
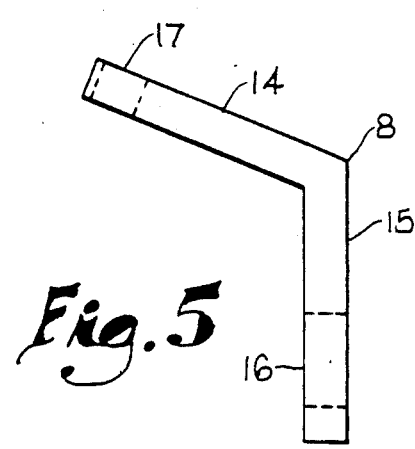

REDUCTION OF CALIPER LINING WEAR IN AIR BRAKES

BACKGROUND OF THE INVENTION

This invention relates to an improvement in air brakes of the type wherein a caliper moves a brake shoe against the outboard side of a rotor while, concurrently, a piston moves a brake shoe against the inboard side of the rotor, and, the caliper moves on upper and lower slide pins, and, the caliper supports an air chamber. Such air brakes are exemplified by Rockwell DURA-MASTER ® Air Disc Brakes as described in Field Maintenance Manual No. 4M of Automotive Operations, Rockwell International Corporation, 2135 West Maple Road, Troy, Mich. 48084, the revision of 4-87.

A persistent problem with this type of air brake has been excessive wear on the outboard brake lining and the outboard surface of the rotor, caused by failure of the caliper to retract upon brake release. The cause of this failure to retract has been attributed to the caliper binding on the slide pins.

Attempts to resolve the problem have been numerous. One attempted solution to the problem involved a change in the slide pin bushings where a split bushing was changed to a one-piece press-in bushing with no apparent improvement.

Another attempted solution was a redesigned slide pin. This design introduced on "O" ring in a groove on the slide pin to provide a buffer area between the caliper bushings and the slide pin to eliminate binding. This change exacerbated the problem.

A more recent attempt at solving the problem included enlarging the inside diameter of the bushing, and the introduction of a larger "O" ring on the slide pins and the addition of an accelerator valve. This made the problem even worse.

The problem of failure of the caliper to retract with consequent excessive wear on the caliper and outboard face of the rotor and the efforts to resolve the problem have persisted for more than 10 years with no workable solution prior to the present invention, which reduces the frictional forces on the guide pins by suspending a portion of the weight of the air chamber from the upper slide pin while providing a component of force opposite to the direction of movement of the caliper when the caliper produces a braking force on the outboard surface of the rotor.

It is, therefore, an object of this invention to reduce wear in the break lining of the caliper in a brake of the type described.

A concurrent object of this invention to reduce wear on the outboard surface of the brake rotor in such brakes.

It is further object of this invention to reduce downtime and maintenance costs in these brakes.

It is a still further object of this invention to achieve the foregoing objects by a simple and economical method of retrofitting existing brakes.

BRIEF DESCRIPTION OF THE DRAWING

In the drawings:
FIG. 1 is a view of an air brake.
FIG. 2 is a frontal view clip 6.
FIG. 3 is a side view of clip 6.
FIG. 4 is a front view of clip 8.
FIG. 5 is a side view of clip 8.

DETAILED DESCRIPTION OF THE INVENTION

The brake shown in FIG. 1 has an upper slide pin, 1, and a lower slide pin, 2, on which the caliper, 3, moves. The air chamber, 5, is attached to the caliper, 3, by air chamber bracket, 4, the weight of the air chamber being supported along with the caliper by slide pins, 1, and, 2, on which the caliper moves, in the absence of spring, 9. Spring, 9, is connected to the inboard end of upper slide pin, 1, through clip, 6, attached to slide pin, 1, by bolt, 7, and to the air chamber bracket, 4, by clip, 8, attached to the air chamber bracket and the caliper by a bolt securing the bracket to the caliper. Spring, 9, through its attachment to slide pin, 1, supports all or a portion of the weight of the air chamber, which, without the support of spring, 9, would be imposed on the slide pins.

In FIGS. 2 and 3, 11 is the heel of clip, 6, and, 12, is the tang of clip, 6. The clip, 6, is attached to slide pin, 1, through hole, 10, by bolt, 7, as shown in FIG. 1. The hole, 13, in tang, 12, provides a point of attachment for spring, 9.

In FIGS. 4 and 5, 15, is the heel and, 14, the tang of clip, 8. The hole, 17, in tang, 14, provides a point of attachment for spring, 9. The clip, 8, as shown in FIG. 1 is attached to the air chamber bracket, 4, by a bolt attaching the bracket to caliper, 3, through the hole, 16, in heel, 15.

In the practice of this invention means are provided for equalizing the frictional forces on the slide pins by offsetting the force on the slide pins imposed by the weight of the air chamber while at the same time and by the same means providing a force or component of force which acts opposite to the direction of movement of the caliper when the caliper exerts a braking force on the rotor, which force tends to urge the caliper away from the rotor when the brake is released. This is readily done by attaching a spring of appropriate length and spring constant between the end, nearest the air chamber, of the upper slide pin and the upper portion of the air chamber bracket which bracket attaches the air chamber to the caliper. As will be seen from the drawing, the spring, so attached, will be at an angle away from the caliper. As is well-known, a force acting at an angle can be resolved into two components each acting at a right angle to the other. In this case, the vertical component acts to support the air chamber and the horizontal component acts to urge the caliper away from the face of the rotor.

By way of illustration, but not of limitation, the invention may be described with respect to the Rockwell DURA-MATER ® Air Disc Brake described above. With respect to this brake, clip 6, which is used to fasten the spring to the inboard end of the upper slide pin, may have the following dimensions: width $\frac{3}{4}''$, thickness, $\frac{1}{4}''$, heel $\frac{3}{4}''$, tang $\frac{3}{4}''$ with an angle of 165°. between heel and tang; hole, 10, is $\frac{3}{8}''$ in diameter and is centered in the heel of the clip and hole, 13, $\frac{1}{4}''$ in diameter is centered side to side and 3/16" from the end of the tang.

The clip is fastened to the inboard end of the upper slide pin by a $\frac{3}{8}''$ USS bolt inserted into a centered, drilled and tapped $\frac{3}{8}''$ diameter bolt hole in the inboard end of the upper slide pin.

Likewise, suitable dimensions for clip 8 can be as follows: width 1", thickness $\frac{1}{4}''$, heel $1\frac{1}{2}''$, tang $1\frac{1}{2}''$ with the angle between heel and tang being 110°; a hole, 17, $\frac{1}{4}''$ in diameter is centered side to side and 3/16" from the end of the tang; hole 16, in the heel of clip 8 is $\frac{1}{2}''$ in diameter and is centered side to side and 7/16" from the end of the heel of the clip.

Clip 8 is attached through the bolt hole at the top of the connection of the air chamber bracket to the caliper at the bolt nearest to the air chamber.

As will readily be understood, the clips should have the requisite metallurgical properties and tensile strength. Steel is a suitable material.

The force provided by the spring should be approximately equal to the weight of the air chamber or very slightly less. The force should be sufficient to overcome the excess friction on the upper surfaces of the slide pins caused by the weight of the air chamber but not so great as to produce excess friction on the lower surfaces of the slide pins. This force may readily determined with a spring scale by lifting the air chamber to determine the force, in pounds, required to just support the air chamber. One such air chamber required a force of 60 pounds for support.

Thus it may be seen that my invention is an improvement in an air brake system wherein a caliper moves on upper and lower slide pins to force a brake shoe against a rotor and the air chamber is suspended from said caliper, the improvement comprising reducing the frictional force imposed on said slide pin by the weight of the air chamber while providing a force to move the caliper and brake shoe away from the rotor when the brake is released by suspending a portion of the weight of said air chamber from an elastic member, such as a spring, attached to the upper slide pin at the end of the slide pin nearest to said air chamber at an angle providing a component of force opposite to the direction of movement of the caliper when the caliper applies a braking force to said rotor.

As previously described, the force suspending the air chamber and the force opposite the direction of movement of the caliper when the caliper applies a braking force to the rotor can be supplied by a spring of a length and spring constant providing a force approximately equal to the weight of the air chamber connected to the end of the upper slide pin nearest the air chamber and the air chamber support bracket.

My invention may also be described as the method of retrofitting an air brake wherein a caliper moves on slide pins to force a brake shoe against a rotor, and the air chamber is suspended from said caliper, which comprises supporting up to 100% of the weight of the air chamber by an elastic member attached to the end of the upper slide pin nearest the air chamber.

What is claimed is:

1. The method of reducing friction and wear in the caliper brake lining and the outboard surface of the rotor in an air brake system wherein a caliper suspended on upper and lower slide pins moves a brake shoe against the outboard side of a rotor while, concurrently, a piston moves a brake shoe against the inboard side of the rotor and in which an air chamber is suspended from said caliper by an air chamber bracket, said friction and wear being caused by the frictional force imposed by the weight of the suspended air chamber acting upon the slide pins to prevent return of the caliper after brake release which method comprises suspending a portion of the weight of said air chamber from an elastic member attached between the upper slide pin at the end of the slide pin nearest the air chamber and the air chamber bracket at an angle providing a component of force opposite to the direction of the caliper when the caliper applies a braking force to the rotor.

2. The improvement of claim 1 wherein the elastic member is a spring.

3. The improvement of claim 1 wherein the elastic member provides a force approximately equal to the weight of the air chamber.

4. The improvement of claim 1 wherein the elastic member is a spring of a length and spring constant which provides a force up to 100% of the weight of the air chamber.

5. The method of claim 1 wherein a first clip having a heel portion and a tang portion with holes in both heel and tang is bolted to the inboard end of the upper slide pin through the hole in its heel and a second clip having a heel and a tang with holes in both heel and tang is bolted to the air chamber bracket through the hole in the heel of the clip and a spring is connected between said first and second clips through the holes in the tangs of the clips.

6. The method of retrofitting an air brake system wherein a caliper suspended on upper and lower slide pins moves a brake shoe against the outboard slide of a rotor while, concurrently, a piston moves a brake shoe against the inboard side of the rotor, and in which an air chamber is suspended from said caliper by an air chamber bracket bolted to the caliper, to reduce friction and wear on the caliper brake shoe and outboard face of the rotor caused by the frictional force imposed by the weight of the air chamber acting through the caliper upon the slide pins to prevent return of the caliper after brake release which comprises: adding a first connection for an elastic member to the inboard end of the upper slide pin; adding a second connection for an elastic member to the air chamber bracket where the bracket is bolted to the caliper; and attaching an elastic member between said first and second connections.

7. The method of claim 6 wherein the elastic member is attached at an angle providing a component of force opposite to the direction of movement of the caliper when applying a force against the rotor.

8. The method of claim 6 wherein the elastic number is a spring.

9. The method of claim 6 wherein the elastic member is a spring attached at an angle providing a component of force opposite the direction of movement of the caliper when applying a force against the rotor.

10. The method of claim 6 wherein the inboard end of the upper slide pin is provided with a centered, drilled and tapped hole; a clip having a heel portion and a tang portion with holes drilled through both heel and tang is bolted to the inboard end of the upper slide pin by a bolt fitted to the said centered, drilled and tapped hole through the hole in the heel of the clip; a bolt by which the air chamber bracket is bolted to the caliper is removed; a second clip having a heel portion and a tang portion with holes drilled in both heel and tang is bolted to air chamber bracket and caliper through the hole in its heel by replacing the bolt removed from the air chamber bracket and caliper; and a spring of length and spring constant capable of supporting up to 100% of the weight of the air chamber is attached between the upper slide pin and the air chamber bracket through the holes in the tangs of the respective clips.

* * * * *